United States Patent [19]

Hirano et al.

[11] Patent Number: 5,378,900
[45] Date of Patent: Jan. 3, 1995

[54] CRYSTAL DIAMETER MEASURING DEVICE

[75] Inventors: Yoshihiro Hirano; Masahiko Baba, both of Annaka, Japan

[73] Assignee: Shin-Etsu Handotai Co., Ltd., Tokyo, Japan

[21] Appl. No.: 158,849

[22] Filed: Nov. 29, 1993

[30] Foreign Application Priority Data

Nov. 27, 1992 [JP]  Japan .................................. 4-319053

[51] Int. Cl.⁶ ............................................. G01N 21/86
[52] U.S. Cl. ..................................... 117/201; 250/560
[58] Field of Search ................ 250/560, 561; 156/601, 156/617.1; 382/8; 356/384, 387

[56] References Cited

U.S. PATENT DOCUMENTS 4,794,263  12/1988  Katsuoka et al. .
5,138,179   8/1992  Baba et al. ........................... 250/560
5,170,061  12/1992  Baba ..................................... 250/560

*Primary Examiner*—David C. Nelms
*Assistant Examiner*—K. Shami
*Attorney, Agent, or Firm*—Browdy and Neimark

[57] ABSTRACT

The growing portion of a single crystal 1 grown by the pull method is recorded and the image signal is output to a digitizing circuit 3 that converts the image signal into binary data. A memory device 4 stores the digitized images and the point P at the boundary between dark and light is detected by scanning the stored digitized images starting from the scanning-start pixel and proceeding in the direction parallel to the direction of single crystal pulling. The diameter D of the growing portion of the single crystal is determined based upon the boundary P, and the scanning-start pixel for the current operation is set at the pixel that is separated from the boundary Pb in the preceding operation by a preset number of pixels d in the opposite direction of the scan.

4 Claims, 7 Drawing Sheets

CRYSTAL DIAMETER MEASURING DEVICE

BACKGROUND OF THE INVENTION

1. Field of the Invention

The present invention relates to a crystal diameter measuring device that measures the diameter of the growing portion of a single crystal grown with the pull method (Czochralski technique).

2. Description of the Prior Art

As shown in FIG. 7, the single crystal 36 is grown by immersing the seed crystal 34 in a melt within a crucible and then by pulling it up while the seed crystal 34 is held at the lower end of the pulling shaft 30 by the seed holder 32. In the single crystal 36, a cone-shaped portion 36c is grown following the neck 36t that is grown adjacent to the seed crystal 34.

When pulling an Si single crystal out of an Si melt, volatile SiO is formed due to the reaction between the quartz crucible and the Si melt and this is deposited on the brim of the quartz crucible, the inner wall of the chamber 10, the pulling shaft 30 and the single crystal itself 36. The SiO that is deposited on the pulling shaft 30, which is elevated while rotating, is then scraped off by the ring gasket which provides an air tight seal on the upper lid, and falls down into the melt, causing a defect in the single crystal 36 being formed there.

In order to deal with this problem, a method has been disclosed for example, Japan Patent First Publication No. 64-650865 in which a rectification cylinder 38 is suspended concentrically with the pulling shaft 30, approximately 5 to 100 mm above the surface of the melt and Ar gas flows down from above into the rectification cylinder 38, to expel the SiO, evaporated from the surface of the melt, along with the Ar gas through the lower section of the chamber. The inner diameter of the rectification cylinder 38 is set so that the minimum distance between the inner surface of the rectification cylinder 38 and the surface of the single crystal 36 is 5 to 100 mm.

A window 40 is provided at the lower section of the rectification cylinder 38. The rectification cylinder 38 may be formed of, for example, graphite and the window 40 may be formed of quartz. Through this window 40, the single crystal 36 is recorded with a CCD camera or the like and by processing the image, the diameter D of the luminous ring 44 formed at the solid-liquid interface is measured.

However, if the width of the window 40 is less than the crystal diameter D, the diameter D of the luminous ring 44 cannot be directly measured by scanning the image in the horizontal direction.

In such a case, the crystal diameter D can be measured by using the method disclosed in Japanese Patent First Publication No. 63-112493. In this method, the crystal diameter D is calculated, by scanning the image in the direction of the axis of the crystal 36 and detecting the position P on the luminous ring 44. The crystal diameter D is calculated from position P when the level of the melt surface is constant and crystal diameter D is calculated from the level of the melt surface and the position P when the level changes.

When the image is scanned from top to bottom in the direction indicated with the arrow A, the area 46A around the luminous ring 44 on the cone-shaped portion 36c becomes light due to the mirror reflection from the tilted face of the cone-shaped portion 36c during its formation, resulting in the position PU being erroneously detected as the position P. Consequently, the crystal diameter D cannot be measured accurately. During growing a cylindrical body portion whose diameter is more or less consistent throughout, this problem does not occur.

Also, when the image is scanned from bottom to top in the direction indicated with the arrow B, the position PD is erroneously detected as the position P because of the strong reflection from the area 46B on the melt surface. And just as in the case of downward scanning described above, the measured diameter is not accurate.

The position and size of the light area 46A change as growing the crystal and the position and size of the light area 46B change with the change in the melt surface level.

SUMMARY OF THE INVENTION

Accordingly, an object of the present invention is to provide a crystal diameter measuring device in which the luminous ring formed on the solid-liquid interface is scanned in the transverse direction on a digitized image and in which it is possible consequently to measure the diameter of the cone-shaped portion accurately.

FIG. 1 shows the principle structure of the crystal diameter measuring device according to the present invention.

This crystal diameter measuring device is provided with a camera 2, that records the growing portion of a single crystal 1 grown by the pull method. It outputs the image signal to a digitizing circuit 3 that converts the image signal into binary data. A memory device 4 stores the digitized images and a means 5 of detecting the point P at the boundary between dark and light detects the point P at which the image changes from dark to light by scanning the stored digitized images starting from the scanning-start pixel and proceeding in the direction parallel to the direction of single crystal pulling. A means of diameter detection 6 determines the diameter D of the growing portion of the single crystal based upon the boundary P and a means of determining the scanning-start pixel 7 sets the scanning-start pixel for the current operation at the pixel that is separated from the boundary Pb in the preceding operation by a preset number of pixels d in the opposite direction of the scan.

The position and size of the light area 8A (the area where the digitized image becomes light) on the cone-shaped portion of the single crystal 1 near the luminous ring 1a change as the growth of the crystal and the position and size of the light area 8B on the melt near the luminous ring 1a change with the change in the melt surface level. However, according to the present invention, since the scanning-start point changes accordingly, it is easy to prevent the light areas 8A and 8B from being detected before the detection of the boundary of dark and light at the luminous ring 1a by selecting the number of pixels d preferably based upon experience. With this, erroneous detection of position P is prevented and it becomes possible to measure the crystal diameter D accurately.

In the first aspect of the present invention, the camera 2 is a one-dimensional camera.

With this structure, since the digitized image is one-dimensional, the processing performed by the means 5 of detecting the boundary of dark and light and by the means of diameter detection 6 becomes easier.

In the second aspect of the present invention, the camera is a two-dimensional camera and the means of diameter detection 6 determines the diameter D of the growing portion of the single crystal from the boundary of dark and light Pm at which the number of pixels scanned y starting with the scanning-start pixel to the boundary of dark and light P is at a minimum. The means of determining the scanning-start pixel 7 sets the pixel that is separated from the boundary of dark and light Pmb, detected in the previous operation, at which the number of scanned pixels is at a minimum, by a preset number of pixels d in the opposite direction of the scanning, as a reference point O. It sets all the pixels w within the width in the direction perpendicular to the aforementioned scanning direction with the reference point O as the mid-point, as scanning-start pixels for the current operation.

With this structure, even when the single crystal axis deviates, it is possible to measure the crystal diameter D more accurately than what is possible in the first aspect above.

In the third aspect of the present invention, the means of diameter detection 6 ends the scanning operation on the scanning line if the boundary of dark and light is not detected when scanning has been performed for a preset number of pixels h starting with the scanning-start pixel and proceeding in the direction of the scan.

With this structure, the processing performed by the means of diameter detection 6 is simpler.

DESCRIPTION OF THE PREFERRED EMBODIMENT

Following is an explanation of an embodiment of the present invention with reference to the drawings.

Figure 4:
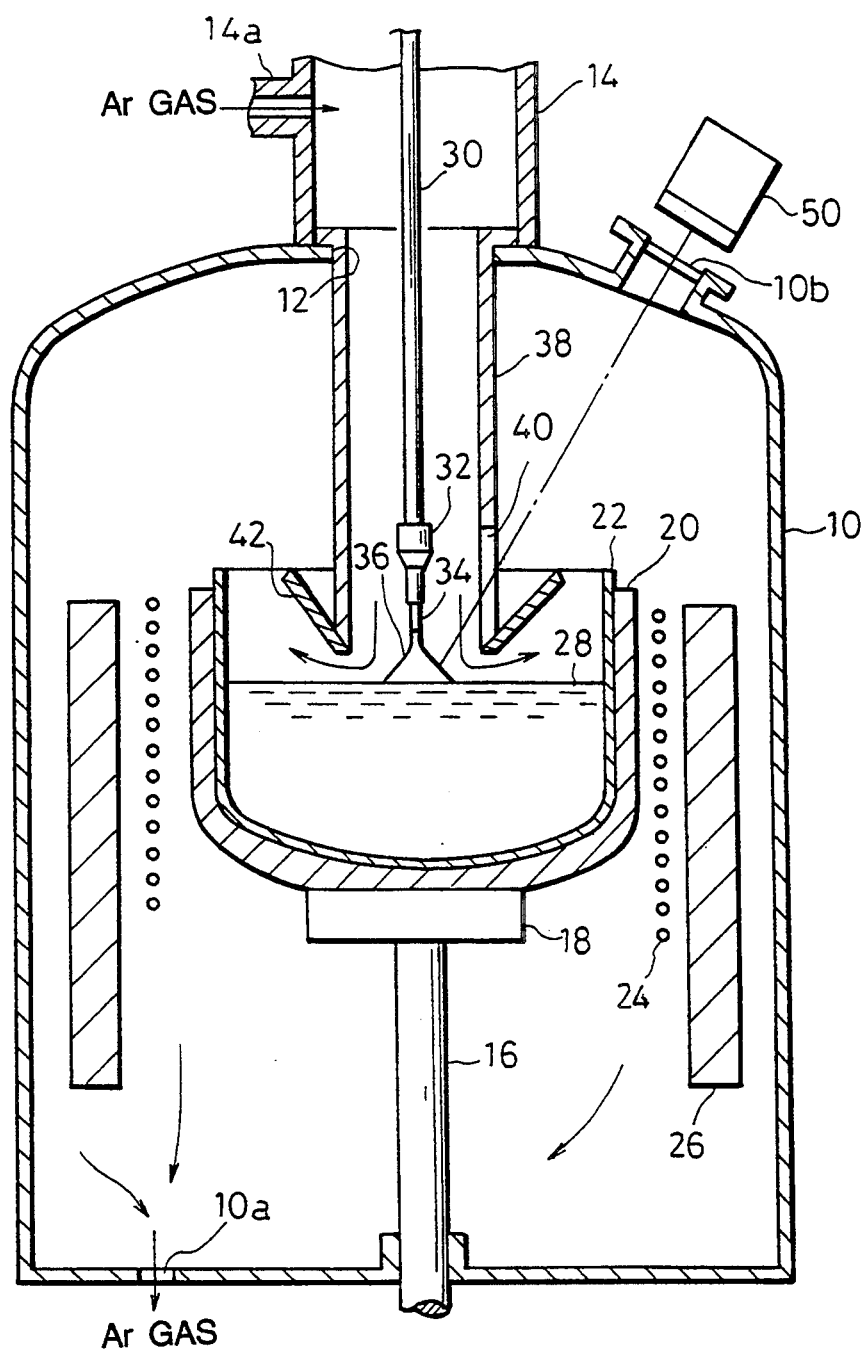
FIG. 4 is a cross section of a single crystal growing device.

FIG. 4 is a cross section of the main components of a crystal growing device.

The sub-chamber 14 is connected to the upper opening 12 of the main chamber 10. On the side wall of the sub-chamber 14, an inlet joint 14a is provided, where the Ar gas supply pipe is connected and on the bottom surface of the main chamber 10, an exhaust vent 10a is provided for the outlet of Ar gas. Within this main chamber 10, a table 18 is secured on the upper edge of the rotating elevator shaft 16 and a graphite crucible 20 is located on the table 18. A quartz crucible 22 is fitted within the graphite crucible 20. The graphite crucible 20 is enveloped by the heater 24 and the heater 24 is enveloped by a graphite adiabatic wall 26. An Si polycrystal is placed inside the quartz crucible 22 and when power is supplied to the heater 24, the Si is melted to become the melt 28.

A seed crystal 34 is held by the seed holder 32 at the lower end of the pulling shaft 30, which is elevated and lowered along the central axis of the sub-chamber 14.

The upper opening of the graphite rectification cylinder 38 is connected to the upper opening of the main chamber 10. The rectification cylinder 38 is positioned vertically and concentrically with the pulling shaft 30. A reflector 42 with a circular cross section is secured onto the lower end of the rectification cylinder 38 to block the radiant heat from the surface of the melt 28 and from the inner wall of the quartz crucible 22 from being communicated to the single crystal 36, thereby speeding up the rate of growing the single crystal 36.

The window 40 for observation is provided at the lower end of the rectification cylinder 38 and a view window 10b is provided at the shoulder portion of the main chamber 10 to align with the window 40. Outside the view window 10b a CCD camera 50 is positioned to face the window 40 squarely and it records the growing portion of the single crystal 36 through the view window 10b and the window 40.

Figure 5:
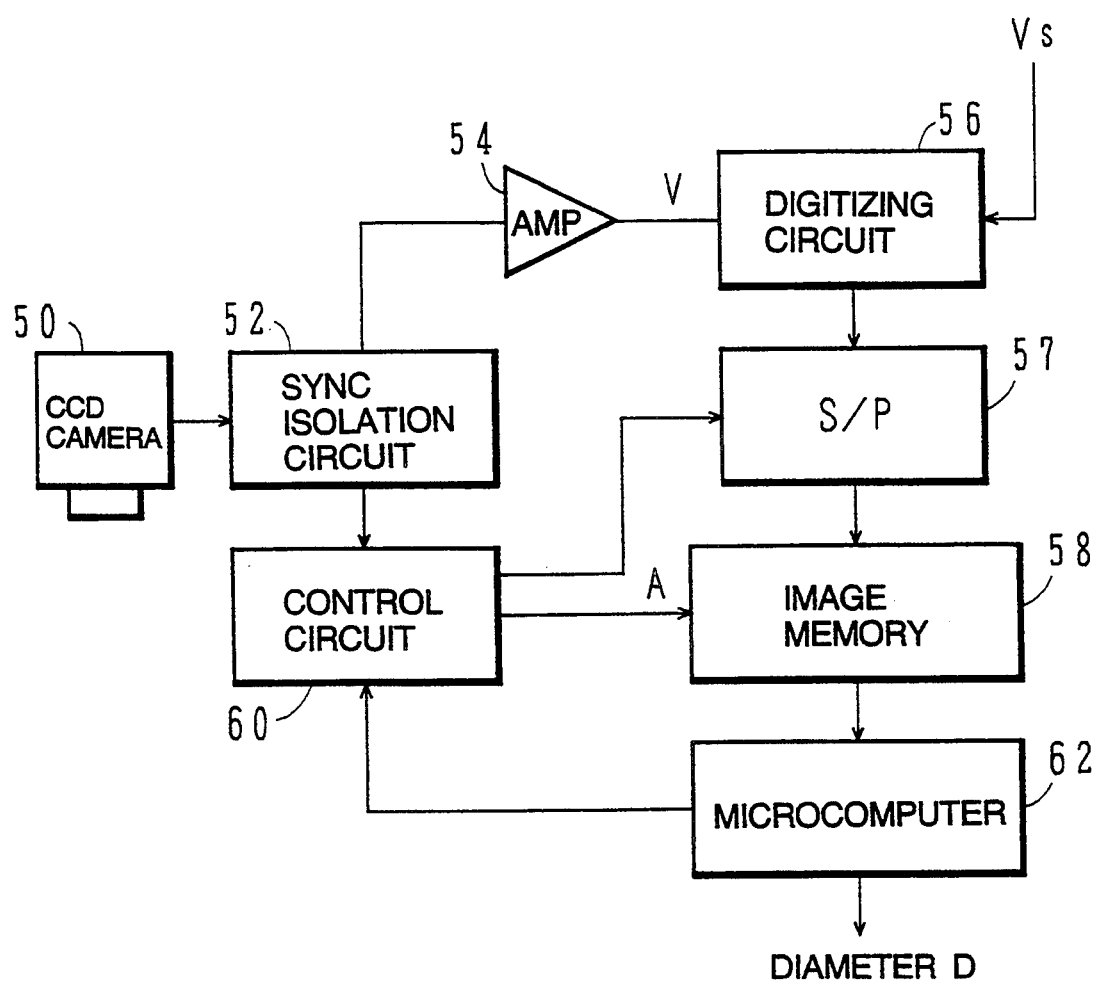
FIG. 5 is a block diagram of the crystal diameter measuring device.

As shown in FIG. 5, the output signals from the CCD camera 50 are sent to the sync isolation circuit 52 to be separated into image signals and sync signals. The image signals are amplified by the amplifier 54 and are digitized by comparing their voltage V against the reference voltage Vs in the digitizing circuit 56. Then the data are converted to parallel data by the S/P converter 57. In the meantime, the sync signals from the sync isolation circuit 52 are sent to the control circuit 60 where the S/P conversion clock and the addresses that correspond with the scanning position are generated. Then the output from the S/P converter 57 is stored in the image memory 58 at the specified address. The microcomputer 62 then sets the control circuit 60 in the operating mode to read out the image stored in the image memory 58, processes the image to obtain the crystal diameter D and outputs it.

Figure 6:
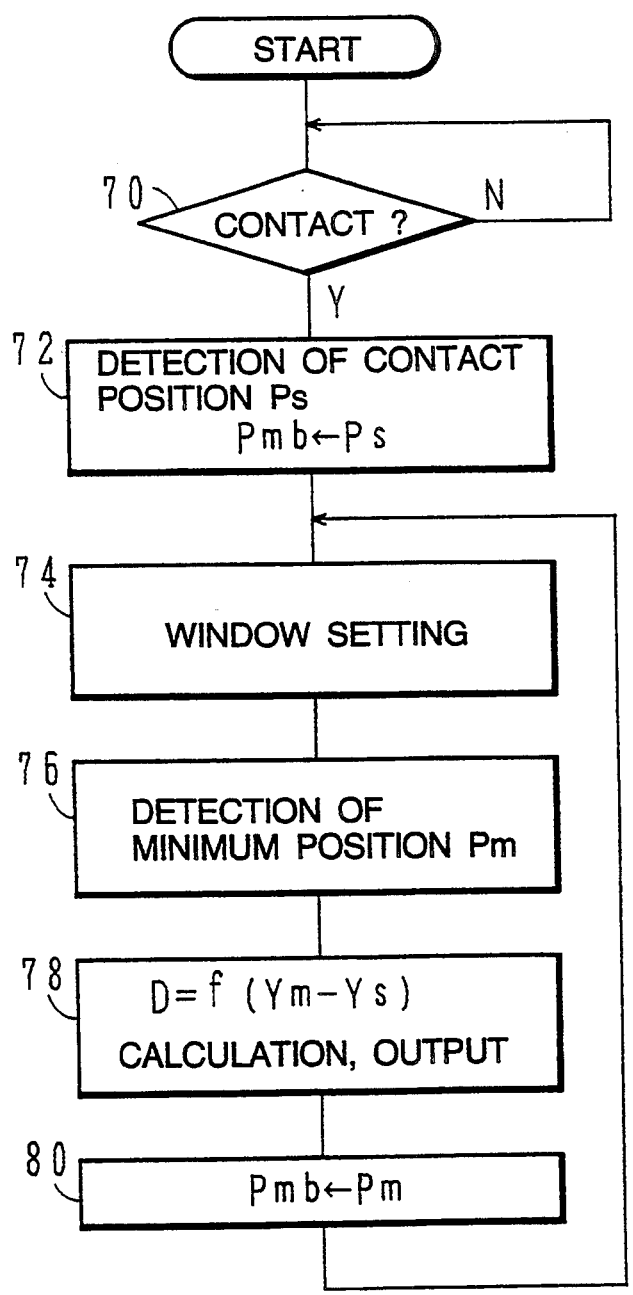
FIG. 6 is a flow chart showing the crystal diameter measuring procedure.

Next, the processing performed by the microcomputer 62 is explained in reference to FIG. 6. Hereafter, the values inside the parenthesis indicate the step numeral used in the figure.

(70) The seed crystal 34 is lowered and the operation waits for the seed crystal 34 to come in contact with the melt surface. This contact can be sensed in various ways; for example, from the downward travel distance of the pulling shaft 30 and the initial level of the melt surface. The contact can also be detected by applying a voltage between the pulling shaft 30 and the crucible and by detecting a change in the current running between them.

Figure 1:
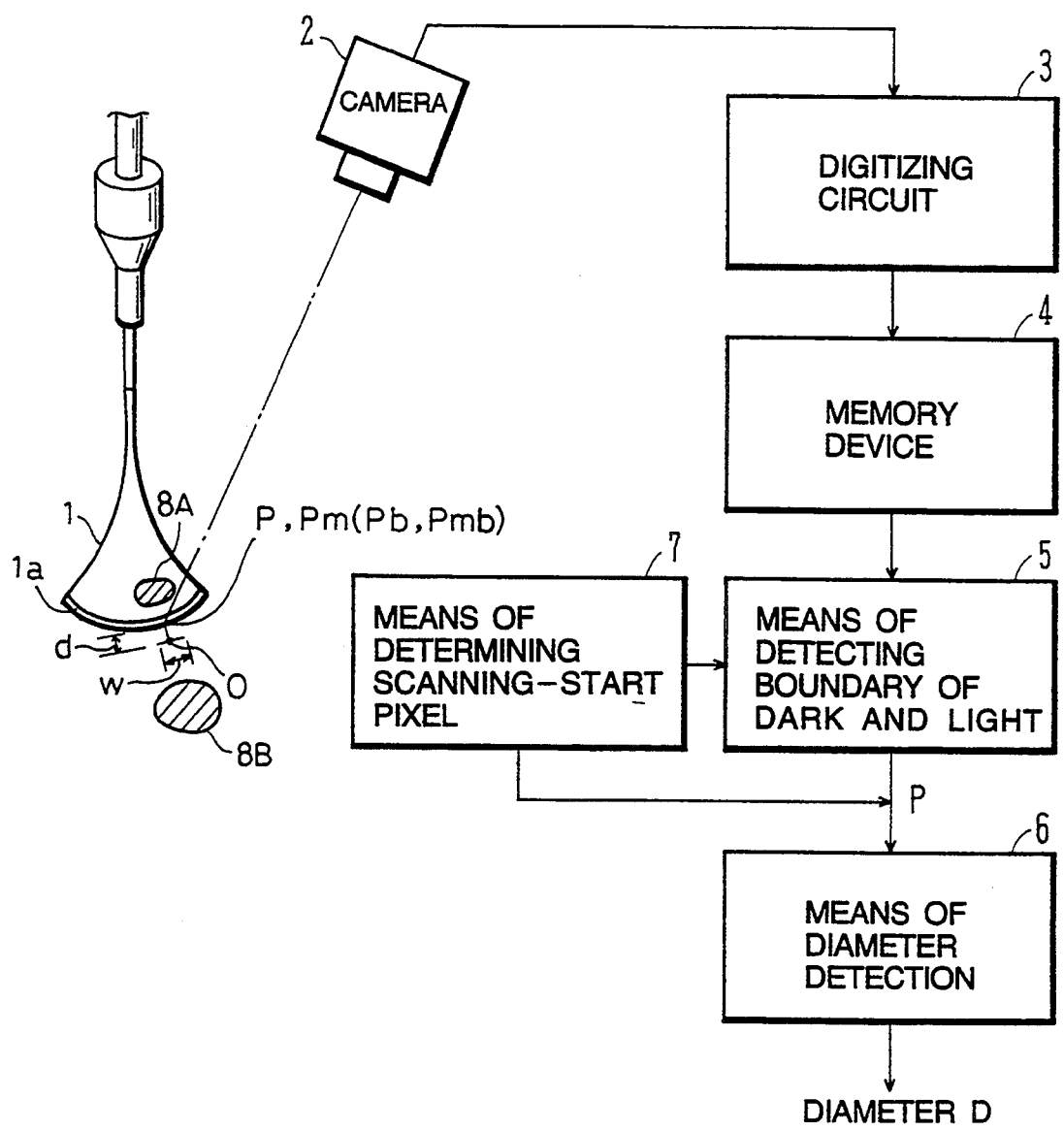
FIG. 1 is a structural diagram illustrating the principle structure of the present invention.
Figure 2A:
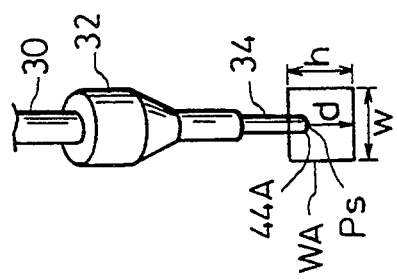
FIGS. 2A to 2D are diagrams showing the operation of an embodiment of the crystal diameter measuring device according to the present invention.
Figure 2B:
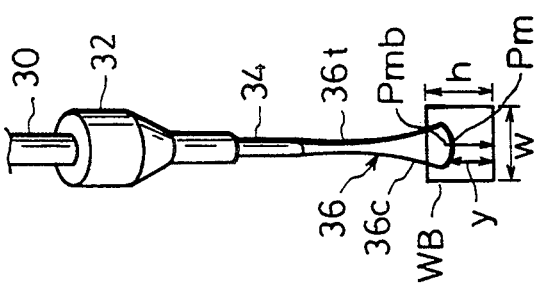
Figure 2C:
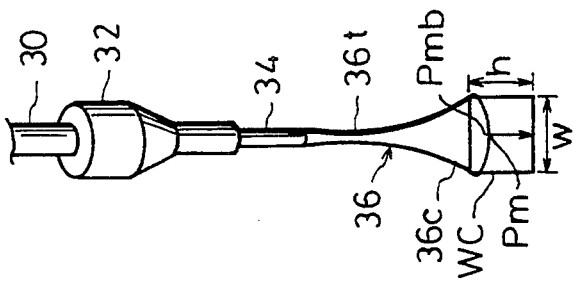
Figure 2D:
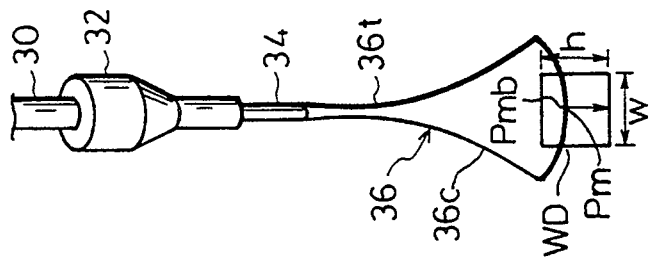

(72) After contact, the control circuit 60 is set into operating mode to store the image in the image memory 58. From this image, the position Ps of the luminous ring 44A shown in FIG. 2A is detected. The luminous ring 44A can also be detected by comparing images of the seed crystal 34 before and after contact with the melt surface. This position Ps is used as the initial value for the position Pmb which is to be explained later.

Figure 3:
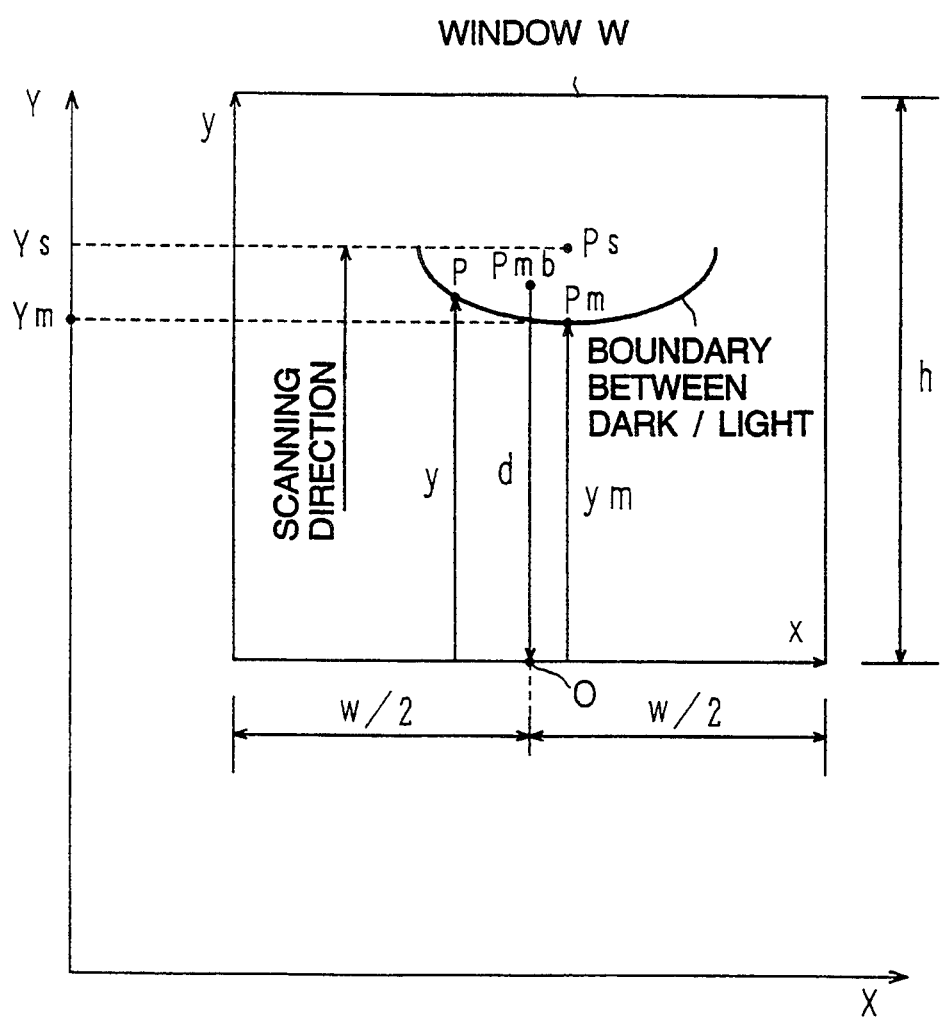
FIG. 3 is a diagram explaining the image processing performed by the crystal diameter measuring device.

(74) As shown in FIG. 3, the point that is separated from the position Pmb on the image by a preset number of pixels d in the downward direction is set as the reference point O and a window W is set, of w pixels width and h pixels height. As shown in FIG. 3, an absolute X−Y rectangular coordinate system for all images is set and an x−y rectangular coordinate system relative to the images within the window w is set.

(76) The digitized image in the window W is scanned from bottom to top, the pixel positions y at which the change from dark and light are detected and the position Pm where y is at the minimum value is detected. The value of y at this time is designated as ym. The pixel positions in the direction Y on all images that correspond with the pixel Ps and Pm inside the window W are designated as Ys and Ym respectively.

(78) When the melt surface level is constant, the crystal diameter D is calculated from D=f(Ym−Ys) and the value is output. This function f(Ym−Ys) is obtained experimentally or through geometric calculation and is provided to the microcomputer 62 in advance. When the melt surface level height deviates, the level is detected by a detection device not shown and the crystal diameter D is calculated from this level and the position P and is then output.

(80) The position Pm is set as the position Pmb and the operation goes back to step 74 described above.

Figure 7:
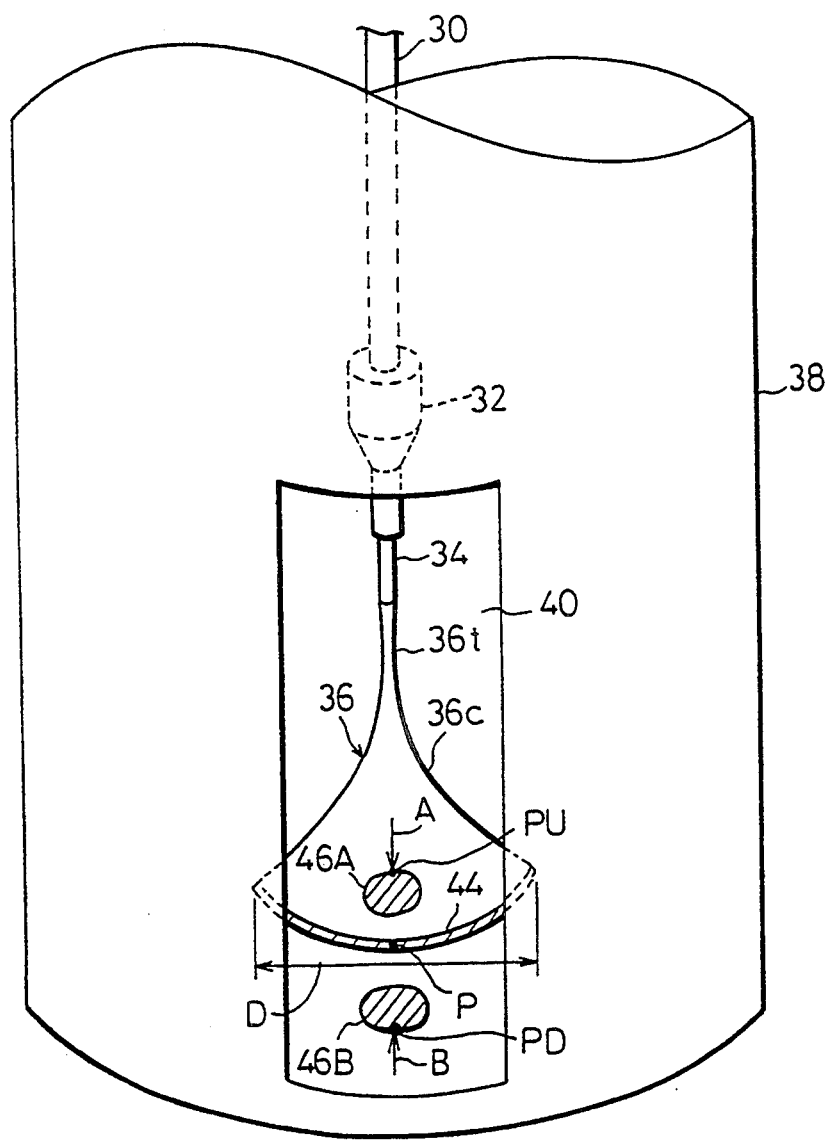
FIG. 7 is a diagram explaining the problems of the prior art system.

The position and size of the light area 46A shown in FIG. 7 change as the growth of the crystal and the position and size of the light area 46B change with the change in the melt surface level. Now, if the processing described above is repeated during the growth of the single crystal 36, windows WA to WD that change accordingly as shown, for example, in FIG. 2A to 2D are set and the crystal diameter D can be obtained. Therefore, by choosing preferable values for d, w and h based upon experience, the light areas 46A and 46B can be easily kept out of the window W and the erroneous detection of position P can thereby be prevented and it becomes possible to measure the crystal diameter D accurately.

Having described specific embodiment of the present invention, it is to be understood that modification and variation of the invention are possible without departing from the spirit and scope thereof.

For example, in the embodiment described above, a system using a two dimensional camera is presented, but the present invention may also be implemented with a one-dimensional camera. Furthermore, in the embodiment described above, explanation was given for a case in which the scanning direction of the digitized images is the same as the pulling direction of the single crystal. This direction may also be the opposite direction.

What is claimed is:

1. A crystal diameter measuring device comprising:
    a camera (2) for recording a growing portion of a single crystal (1) grown by a pull method and outputting image signals thereof;
    a digitizing circuit (3) for converting said image signals into binary data;
    a memory device (4) for storing said binary data;
    a means (5) for detecting a point (P) at a boundary between dark and light by scanning said stored binary data in a direction parallel to a direction of single crystal pulling starting from a scanning-start pixel;
    a means (6) for detecting a diameter (D) of said growing portion of said single crystal based upon said boundary (P); and
    a means (7) for determining said scanning-start pixel in current operation, said scanning-start pixel being separated from said boundary (Pb) in preceding operation by a preset number of pixels (d) in the opposite direction of the scanning.

2. A crystal diameter measuring device according to claim 1 wherein said camera (2) is a one-dimensional camera.

3. A crystal diameter measuring device according to claim 1 wherein:
    said camera is a two-dimensional camera;
    said means for detecting said diameter (D) detects said diameter based on said boundary of dark and light (Pm) at which a number of pixels scanned (y) from said scanning-start pixel to said boundary of dark and light (P) is at a minimum; and
    said means (7) for determining said scanning-start pixels in current operation determines said scanning-start pixels which are on a line within a length in a direction perpendicular to said scanning direction with a reference point (O) separated from said boundary (Pb) in preceding operation by a minimum and preset number of pixels (d) in the opposite direction of the scanning, said reference point being a mid point of said length.

4. A crystal diameter measuring device according to claim 3 wherein:
    said means for detecting said diameter (6) ends the scanning operation on a scanning line if said boundary of dark and light is not detected when scanning has been performed for a preset number of pixels (8) starting with said scanning-start pixel on said scanning line.

* * * * *